United States Patent [19]
Moran et al.

[11] Patent Number: 5,204,920
[45] Date of Patent: Apr. 20, 1993

[54] METHOD AND APPARATUS FOR REGION AND TEXTURE CODING

[75] Inventors: David Moran, Crawley; Octavius J. Morris, Redhill, both of Great Britain

[73] Assignee: U.S. Philips Corporation, New York, N.Y.

[21] Appl. No.: 836,178

[22] Filed: Feb. 12, 1992

Related U.S. Application Data

[63] Continuation of Ser. No. 640,324, Jan. 10, 1991, abandoned.

[30] Foreign Application Priority Data

Jan. 12, 1990 [GB] United Kingdom ................. 9000721
Mar. 23, 1990 [GB] United Kingdom ................. 9006498
Nov. 30, 1990 [GB] United Kingdom ................. 9026137

[51] Int. Cl.$^5$ ............................................. G06K 9/40
[52] U.S. Cl. ........................................ 382/54; 382/22
[58] Field of Search ....................... 382/17, 22, 54, 56; 358/428, 463–464, 466, 467

[56] References Cited

U.S. PATENT DOCUMENTS

| | | | |
|---|---|---|---|
| 4,636,863 | 1/1987 | Kaizaki et al. | 382/22 |
| 4,817,038 | 3/1989 | Knoll et al. | 382/45 |
| 4,849,914 | 7/1989 | Medioni et al. | 382/52 |
| 4,949,281 | 8/1990 | Hillenbrand et al. | 382/22 |

OTHER PUBLICATIONS

Kunt et al., "Second-Generation Image-Coding Techniques", *Proc. of the IEEE*, vol. 73, No. 4, Apr. 1985, pp. 549–574.

Moran et al., "Region and Texture Coding of TV Pictures", *3rd Intellectual Conference on Image Proc. and Its Applic.* (IPA 89), Warwick, UK., Jul. 1989, pp. 536–540.

Primary Examiner—Jose L. Couso
Attorney, Agent, or Firm—Leroy Eason

[57] ABSTRACT

A luminance signal (Y) is applied to a segmentation device (2) which subjects the signal to a segmentation algorithm to produce a region image signal which is then encoded in a region image encoder (3). The region image signal is also applied to a region post-processor (4) in which an adapted smooth function is added to the region signal. The resulting modified region image signal is subtracted in subtractor (5) from the luminance signal to produce a texture signal which is encoded by a texture image encoder (6). The encoded signals are conveyed via a data channel (9) to respective region (12) and texture (14) image decoders and the recovered region image signal is post-processed in a processor (13) in the same manner as with processor (4). The resulting modified region image signal and the recovered texture image signal are added in an adder (15) to produce a reconstructed luminance signal. The smoothing function takes account of step edge height between adjacent regions and the width of the regions, so that it can be applied to all contour edges without having to identify and avoid those which are erroneous with respect to the luminance signal.

20 Claims, 1 Drawing Sheet

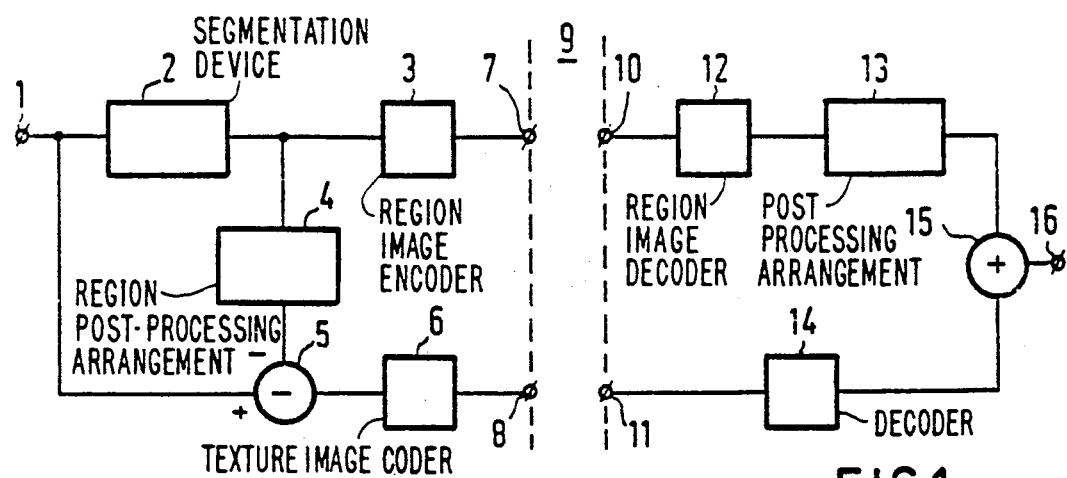
FIG.1
FIG.2A
FIG.3A
FIG.3B
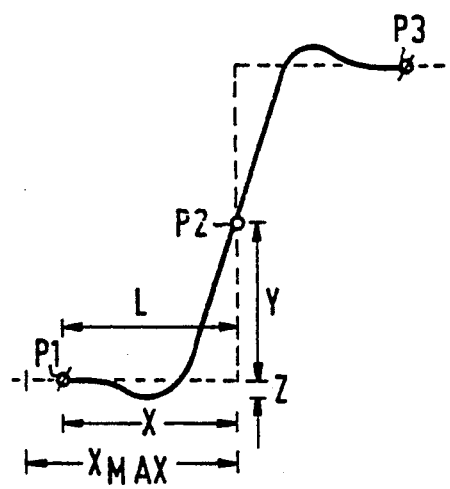
FIG.2B
FIG.3C
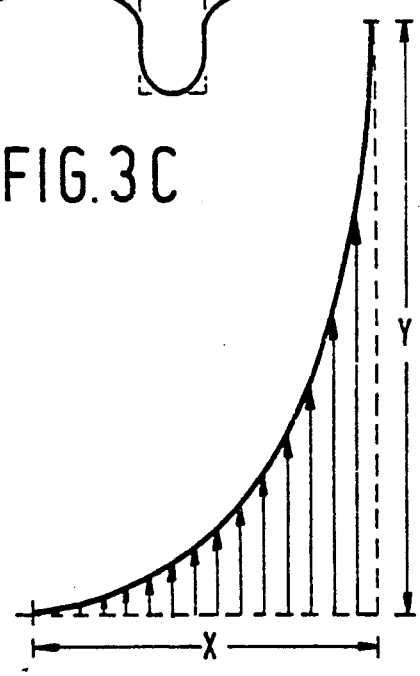
FIG.4
FIG.5

5,204,920

METHOD AND APPARATUS FOR REGION AND TEXTURE CODING

This is a continuation of application Ser. No. 640,324, filed Jan. 10, 1991 now abandoned.

BACKGROUND OF THE INVENTION

The invention relates to a method of processing a picture signal for conveyance by means of a transmission path or storage medium, said method comprising the steps of:
i) producing a picture signal which corresponds to a picture,
ii) subjecting said picture signal to a segmentation algorithm to produce a region signal which identifies edges and closed regions in said picture,
iii) producing a modified region signal by post-processing the region signal produced in step (ii), and
iv) producing a texture signal which corresponds to the difference between the picture signal produced in step (i) and the modified region signal produced in step (iii).

The invention also relates to a method of recovering a picture signal when received in such two component (region and texture) form and apparatus for performing either of the two methods.

Decomposing a picture signal into two components using features identified in the original picture is well known; see for instance "Second-Generation Image-Coding Techniques" by M. Kunt, A. Ikonomopoulos and M. Kocher, Proceedings of the IEEE, volume 73, No. 4, April 1985, pages 549 to 574. The two components then can be coded separately. The reasoning behind this approach is that by finding and encoding perceptually important features of the picture they will be preserved and that by the separation of the picture signal into two components of very different character it is possible to design efficient codes for each of them. Image bandwidth compression aims to reduce the amount of information that must be transmitted while simultaneously preserving the quality of the decoded picture. Region coding schemes so far proposed with good compression tend to be complex. That disclosed in "Region and texture coding of TV pictures" by D. Moran and O. J. Morris, 3rd Intellectual Conference on Image Processing and its Applications (IPA 89), pages 536–540, Warwick, U. K., July 1989 includes post-processing of the region signal prior to the production of the texture signal at the encoder end and similar post-processing of the region signal at the decoder end prior to the reproduction of the picture signal from the recovered region and texture signals. The post-processing involves the adaptive smoothing of false contour edges in the region signal and to achieve this the edges need to be examined to determine whether the contour edge is false or not. In the absence of such determination all edges would be similarly smoothed. Thus such post processing requires false contour detection which adds to its complexity whilst it only operates across a limited number of pixels (one) on either side of a boundary.

SUMMARY OF THE INVENTION

It is an object of the present invention to provide a method and apparatus for region and texture image coding which is less complex than that above proposed.

The invention provides a method of processing a picture signal for conveyance by means of a transmission path or storage medium, comprising
i) producing a picture signal which corresponds to a picture,
ii) subjecting said picture signal to a segmentation algorithm to produce a region signal which identifies edges and closed regions in said picture,
iii) producing a modified region signal by post processing the region signal produced in step (ii), and
iv) producing a texture signal which corresponds to the difference between the picture signal produced in step (i) and the modified region signal produced in step (iii),
characterised in that the production of said modified region signal comprises the steps of:
v) producing an appropriate smooth function which is adapted to said region signal, and
vi) adding the function produced in step (v) to said region signal.

The invention also provides a method of recovering a picture signal received in the form of a first component related to the regions of said picture signal and a second component related to the texture of said picture signal, said method comprising the steps of:
i) receiving said region related component and producing a region signal therefrom,
ii) receiving said texture related component and producing a texture signal therefrom,
iii) producing a modified region signal by post-processing the region signal recovered in step (i), and
iv) producing a recovered picture signal by combining said modified region signal produced in step (iii) and said recovered texture signal produced in step (ii)
characterised in that the production of said modified region signal comprises the steps of:
v) producing an appropriate smooth function which is adapted to said region signal, and
vi) adding the function produced in step (v) to said region signal.

The above methods have the advantage that the post-processing may be applied to every boundary as the use of a smooth function can take into account the step edge height between adjacent regions and the width of the region. The post-processing is therefore less complex to perform to that previously described.

The smooth function for the methods may be a polynomial providing the approximation $$f(x) = ax^3 + bx^2 + cx + d.$$

where a, b, c and d are coefficients chosen to provide a spline function f(x) which is adapted to the properties of the region signal and x is the distance from its assoicated step edge.

The invention further provides apparatus for processing a picture signal for conveyance by means of a transmission path or storage medium, said apparatus comprising means for producing a picture signal which corresponds to a picture, means for subjecting said picture signal to a segmentation algorithm to produce a region signal which identifies edges and closed regions in said picture, means for producing a modified region signal by post-processing the region signal, and means for producing a texture signal which corresponds to the difference between the picture signal and the modified region signal, characterised in that said means for producing said modified region signal comprises means for producing an appropriate smooth function which is adapted to said region signal and means for adding said function to said region signal.

The invention additionally provides apparatus for recovering a picture signal received in the form of a first component related to the regions of said picture signal and a second component related to the texture of said picture signal, said apparatus comprising means for receiving said region related component and producing a region signal therefrom, means for receiving said texture related component and producing a texture signal therefrom, means for producing a modified region signal by post-processing the region signal, and means for producing a recovered picture signal by combining said modified region signal and said recovered texture signal, characterised in that said means for producing said modified region signal comprises means for producing an appropriate smooth function which is adapted to said region signal and means for adding said function to said region signal.

Such apparatus may be characterised in that the gradient of said function produced by said function producing means may be dependent on the step edge size between adjacent regions. As an alternative or as an addition the function may be dependent on the width of a region.

The smooth function produced by said function producing means may be a polynomial providing the approximation $$f(x) = ax^3 + bx^2 + cx + d.$$

where a, b, c and d are coefficients chosen to provide a spline function f(x) which is adapted to the properties of the region signal and x is the distance from its associated step edge.

BRIEF DESCRIPTION OF THE DRAWINGS

The above and other features of the invention will now be described, by way of example, with reference to the accompanying drawings, in which:

FIG. 1 is a block diagram of apparatus for use with the present application,

FIGS. 2A-B shows two examples of contours,

FIGS. 3A-C shows examples of region interpolation,

FIG. 4 shows a smooth function added to a contour, and

FIG. 5 is an enlargement of part of FIG. 4.

DETAILED DESCRIPTION OF A PREFERRED EMBODIMENT OF THE INVENTION

In the block diagram of FIG. 1 the reference 1 indicates a terminal for receiving a digitised luminance signal Y which is applied to the input of a segmentation device 2 in which the luminance signal is subjected to a segmentation algorithm which establishes regions of a similar intensity in the image represented by the luminance signal Y and the contours surrounding the regions. The resulting segmented luminance signal (the region image signal) is applied to a region image encoder 3 which encodes the information relating to these contours and the intensities of the regions as identified by the segmentation device 2.

The region image signal from the segmentation device 2 is also applied to a region post-processing arrangement 4 by means of which the region representation is improved by disguising false contours which generate stepped edges in the region signal. By way of example FIG. 2A illustrates a real contoure in the region image signal whilst FIG. 2B illustrates a false contour. In these figures the segmented image signal is represented by the broken line whilst the original image signal is represented by the continuous line. The arrangement 4 adds a smooth function to the intensity values in the region image signal about such stepped edges, the manner in which this is achieved being described in detail hereinafter. The modified region image signal produced by arrangement 4 and the original luminance signal from terminal 1 are applied to respective inputs of a subtractor circuit 5 such that the modified region image signal is subtracted from the luminance signal to produce at its output a luminance texture image signal. As a result of the post-processing of the region image signal, the resulting texture image signal contains a reduced amount of information compared with what it would have contained in the absence of the post-processing. This texture image signal is applied to a texture image signal encoder 6 whose bit rate required to code the texture image signal can be lower than if the region image signal had not been post-processed.

The encoded outputs from the region image coder 3 and the texture image coder 6 are applied to respective output terminals 7 and 8 for application to a data channel in the form of a transmission path or a storage medium diagrammatically indicated by the parallel broken lines 9, with or without further processing as necessary. The part of FIG. 1 described so far forms the transmission encoder. Two further terminals 10 and 11 are also shown connected to the data channel and these form the inputs for the receiving decoder. Terminal 10 receives the encoded region image signal which is applied to a region image signal decoder 12 to reproduce the region image signal. This signal is applied to a further region post-processing arrangement 13 whose mode of operation and purpose is the same as that for the region post-processing arrangement 4 in the transmission encoder to produce an improved region representation corresponding to that produced by arrangement 4. The other input at terminal 11 is the encoded texture image signal which is applied to a texture image decoder 14 to reproduce the texture image signal. The modified region image signal produced by arrangement 13 and the texture image signal produced by decoder 14 are applied to respective inputs of an adder circuit 15 to produce the reconstructed luminance signal Y at an output terminal 16.

As stated above the purpose of the region post-processing arrangement 4 in the transmission encoder, and also for that of the corresponding arrangement 14 in the receiving decoder, is to improve the region representation. Assumptions about where the deficiencies lie in the segmented image can be employed to estimate where compensation should be used to improve the approximation to the original image, without sending extra information. No overhead is required as the properties of the segmented image can be used to determine the parameters of this compensation. A smooth function can simply be added to the intensity values of the region signal after segmentation. By fitting a smooth function to the segmented image, using the post-processing arrangements, it is possible to improve the match between the segmented image and the original image. It is necessary to decide what properties the function should have and what parameters are available to control them.

In the accompanying FIG. 3A a cross-section of a segmented image signal containing a number of contrast contour steps is shown. The curved line represents how a smooth function can be used to improve the representation of the original image. How such a curve can be reproduced from the information in the segmented image can now be defined. It has been found that high contrast edges must remain relatively unchanged in both position and magnitude. This implies that the gradient of the function has to be dependent on the step size between regions to retain sharp transitions, as shown in the accompanying FIG. 3B in which on the left shows a high contrast region boundary whilst on the right shows a low contrast region boundary. Low contrast region boundaries should however have a larger degree of edge spreading (i.e. a shallow gradient) than for high contrast boundaries, giving a reduction in the effect of false contours by changing the decomposition. By smoothing out the edge the region boundary achieves a closer match to the gradually changing intensity. The sharpness of the edges are reduced, changing the decomposition and resulting in a reduction in the high frequency content of the texture signal. Thus as the step height increases the edge spreading of the function should be reduced and vice versa. The function should also be controlled by the region width as shown in the accompanying FIG. 3C which shows a wide region on the left and a narrow region on the right. Narrow regions should have less edge spreading to stop the plateau areas therein from being severely eroded. If narrow regions are allowed to have a large degree of edge spreading the mean intensity value of the segment is likely to change substantially and more information would be transferred into the texture signal. However, bigger regions can suffer much larger distortion to produce a closer match to the original. The change in mean intensity for large regions is usually very small as the majority of pixels remain unchanged.

Now that the properties of the function have been defined a suitable function can be selected. Cubic splines (a third degree polynomial), in the form of the following equation 1, were chosen to provide the approximation $$f(x) = ax^3 + bx^2 + cx + d \qquad (1)$$

where a, b, c and d are coefficients chosen to provide a spline function f(x) which is adapted to the properties of the region signal and x is the distance from its associated step edge. They were considered to be suitable for this application as they have the following properties:

i) fixed end points that the curve must pass through,
ii) definable end point gradients, and
iii) easily computed.

As shown in the accompanying FIG. 4, one end of the spline is fixed at the mid-point P2 of the step edge at a height Y which corresponds to half the step height and the other normally at the mid-point P1 of the plateau at a distance X which corresponds to half the region width. This allows the whole curve to be defined using just these two end points. These two points can be readily calculated from the segmented image. The boundaries of regions (i.e. step edges) can be identified by looking for transitions in the intensity values and the plateau mid-points occur halfway between two step edges in a horizontal or vertical direction.

A spline can overshoot or undershoot the plateau level by Z, so the function is constrained by controlling the plateau end point. This over/undershooting creates intensity humps/hollows in the segmented image which after decomposition makes the texture signal more difficult to encode and hence causes artefacts in the reconstructed image. By calculating the maxima/minima of the curve the maximum distance Xmax of the plateau end point P1 from the edge can be controlled to fix the maximum over/undershoot to a particular percentage of the total edge height (e.g. 5%). The equation of the spline is given in the following equation 2. The turning point of the curve is calculated from this by differentiating with respect to L and equating to zero to give the following equation 3. One of the solutions of this equation gives Xmax, the maximum distance the curve should start from the step edge to stop the percentage overshoot being exceeded.

$$f(L) = aL^3 + bL^2 + cL + d \qquad (2)$$

where:
$a = Y(X - 2S)/SX^3$
$b = Y(3S - X)/SX^2$
$c = 0$
$d = 0$.

$$0 = SX^3/L^2M - X^2 + (3S + L)X - 2SL \qquad (3)$$

where:
$L = 2X(X - 3S)/3(X - 2S)$ and
L is the distance from the plateau end point,
X is half the plateau width,
Y is half the step edge height,
M controls the percentage overshoot of the spline, and
S controls the gradient of the spline at the step edge end point.

A zero gradient is defined for the plateau end point P1 so that each spline is continuous with the next. The edge end point P2 has a gradient which is a function of the edge step height. Again the gradient on either side of the edge mid-point is the same so that the curve remains continuous. Pixels with associated boundary step heights greater than a certain value (e.g. 120) are not processed to avoid the spreading of high contrast edges.

The splines are dependent upon two parameters, the region width and step edge height. The function can therefore be defined as a look-up table to allow simple hardware implementation. By way of example, such a table may have a maximum size of 13.2 kbytes when an eight bit spline value implementation (the value to be added to the pixel intensities) with the constraints (e.g. overshoot control) detailed above are used. The table should also contain all the possible combinations, for each edge step height and plateau width (restricted to control overshooting) of values that can be added to the segmented image to improve the match to the original image.

The maximum plateau width (Xmax) allowed before the spline overshoots by more than the specified percentage is calculated so that the plateau end point P1 can be constrained. If Xmax is less than X the next integer value below Xmax is used as the distance of the plateau end point from the step edge. Initially the splines are fitted along the x-axis of the picture but all horizontal boundaries are missed causing artefacts. This is corrected for by processing the frame in the y-axis and averaging the two together. It is also possible to create a two dimensional system whereby the two operations can occur simultaneously.

The results achieved by this processing are good, with natural looking images being produced. Subjective image quality improves and most false contours are disguised. The information content of the texture is visibly reduced.

Spline fitting gives significant improvements with no overhead. The spline fitting must be repeated at the decoder in the region post-processing arrangement 13. Such post-processing is easy to implement in hardware requiring a relatively small look-up table and simple parameter gathering logic. This is advantageous over techniques which attempt to fit surfaces (i.e. tilted planes and polynomial surfaces) and those which use filtering operators.

The values read out from the look-up table are added to the region image signal as shown in FIG. 5 which shows an enlarged portion of FIG. 4 where the fitted spline has no overshoot. In FIG. 5 the values added at the individual pixel positions are indicated by vertical arrows.

In the above description reference is made only to the processing of a luminance signal Y. However the invention is equally suitable for processing chrominance components U and V as well as the luminance signal Y. This may be done by separate parallel processing of the chrominance components U and V or by not subjecting these components to segmentation but to use the results of the segmentation algorithm applied to the luminance signal Y to define regions in these chrominance components which in turn are used to produce two chrominance texture signals.

From reading the present disclosere, other modifications will be apparent to persons skilled in the art. Such modifications may involve other features which are already known in the design, manufacture and use of apparatus for processing picture signals and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method of processing a picture signal for conveyance by a transmission path or via a storage medium, said method comprising:
   (i) receiving a picture signal which corresponds to luminous intensities in a picture;
   (ii) subjecting said picture signal to a segmentation algorithm to derive a region signal corresponding to a profile of step edges of adjoining closed regions of contrasting luminous intensities in said picture;
   (iii) post-processing the original region signal derived in (ii) to produce a modified region signal which is more free of false step edges in said profile than is the initial region signal; and
   (iv) producing a texture signal which corresponds to the difference between the received picture signal and the modified region signal produced in (iii);

characterized in that the post-processing of the original region signal in (iii) comprises:
   (v) deriving a smoothing function which is adapted to the contour of each of the step edges of said original region signal, such adaptation for any step edge being based on the height of such step edge and the widths of the closed regions of contrasting intensities adjacent thereto; and
   (vi) adding the smoothing function derived in (v) to said original region signal to produce said modified region signal.

2. A method as claimed in claim 1, wherein the gradient of said smoothing function at a step edge of a region is dependent on the step edge size.

3. A method as claimed in claim 2, wherein the said smoothing function is a polynomial providing the approximation $$f(x) = ax^3 + bx^2 + cx + d$$

where a, b, c and d are coefficients chosen to provide a spline function f(x) which is adapted to the geometric properties of the region signal and x is the distance from its associated step edge.

4. A method as claimed in claim 1, wherein the gradient of said smoothing function at a step edge of a region is dependent upon the width of such region.

5. A method as claimed in claim 2, wherein the gradient of said smoothing function at a step edge of a region is dependent upon the width of such region.

6. A method as claimed in claim 3, wherein the gradient of said smoothing function at a step edge of a region is dependent upon the width of such region.

7. An apparatus for processing a picture signal for conveyance by a transmission path or via a storage medium, said apparatus comprising:
   means for receiving a picture signal which corresponds to luminous intensities in a picture;
   means for subjecting said picture signal to a segmentation algorithm to produce a region signal corresponding to a profile of step edges of adjoining closed regions of contrasting luminous intensities in said picture;
   means for post-processing the original region signal to produce a modified region signal which is more free of false step edges in said profile than is the original region signal; and
   means for producing a texture signal which corresponds to the difference between the received picture signal and the modified region signal;

characterized in that said means for post-processing the original region signal comprises:
   means for deriving a smoothing function which is adapted to the contour of each of the step edges of said original region signal, such adaptation for any step edge being based on the height of such step edge and the widths of the closed regions of contrasting intensities adjacent thereto; and
   means for adding said smoothing function to said region signal to derive said modified region signal.

8. An apparatus as claimed in claim 7, wherein the gradient of said smoothing function produced by said function producing means at a step edge of a region is dependent on the step edge size.

9. An apparatus as claimed in claim 8, wherein the said smoothing function produced by said function producing means is a polynomial providing the approximation $$f(x)=ax^3+bx^2+cx+d$$

where a, b, c and d are coefficients chosen to provide a spline function f(x) which is adapted to the geometric properties of the region signal and x is the distance from its asociated step edge.

10. An apparatus as claimed in claim 7, wherein the gradient of said smoothing function produced by said function producing means at a step edge of a region is dependent upon the width of such region.

11. An apparatus as claimed in claim 8, wherein the gradient of said smoothing function produced by said function producing means at a step edge of a region is dependent upon the width of such region.

12. An apparatus as claimed in claim 9, wherein the gradient of said smoothing function produced by said function producing means at a step edge of a region is dependent upon the width of such region.

13. A method of recovering a picture signal received in the form of a first picture signal component and a second picture signal component, the first component being related to a region signal corresponding to a profile of step edges of adjoining closed regions of contrasting luminous intensities in a picture represented by said picture signal, and a second component being related to a texture signal corresponding to a texture characteristic of said picture signal; said method comprising:

(i) receiving said first picture signal component and recovering said region signal therefrom;

(ii) receiving said second picture signal component and recovering said texture signal therefrom;

(iii) post-processing the original region signal recovered in (i) to produce a modified region signal which is more free of false step edges in said profile than is the original region signal; and (iv) producing a recovered picture signal by combining the modified region signal produced in (iii) and the texture signal recovered in step (ii);

characterized in that the post-processing of the original region signal in (iii) comprises:

(v) deriving a smoothing function which is adapted to the contour of each of the step edges of the original region signal, such adaptation for any step edge being based on the height of such step edge and the widths of the closed regions of contrasting intensities adjacent thereto; and (vi) adding the smoothing function derived in (v) to said original region signal to produce said modified region signal.

14. A method as claimed in claim 13, wherein the gradient of said smoothing function at a step edge of a region is dependent on the step edge size.

15. A method as claimed in claim 14, wherein the said smoothing function is a polynomial providing the approximation $$f(x)=ax^3+bx^2+cx+d$$

where a, b, c and d are coefficients chosen to provide a spline function f(x) which is adapted to the geometric properties of the region signal and x is the distance from its associated step edge.

16. A method as claimed in claim 13, wherein the gradient of said smoothing function at a step edge of a region is dependent upon the width of such region.

17. An apparatus for recovering a picture signal received in the form of a first picture signal component and a second picture signal component, the first component being related to a region signal corresponding to a profile of step edges of adjoining closed regions of contrasting luminous intensities in a picture represented by said picture signal, and the second component being related to a texture signal corresponding to a texture characteristic of said picture signal; said apparatus comprising:

means for receiving said first picture signal component and recovering said region signal therefrom;

means for receiving said second picture signal component and recovering said texture signal therefrom;

means for post-processing the original region signal to produce a modified region signal which is more free of false step edges in said profile than is the original region signal; and means for producing a recovered picture signal by combining the modified region signal with said texture signal;

characterized in that said means for post-processing the original region signal comprises;

means for producing a smoothing function which is adapted to the contour of each of the step edges of the original region signal, such adaptation for any step edge being based on the height of such step edge and the widths of the closed regions of contrasting intensities adjacent thereto; and means for adding said smoothing function to said original region signal to produce said modified region signal.

18. An apparatus as claimed in claim 17, wherein the gradient of said smoothing function produced by said function producing means at a step edge of a region is dependent on the step edge size.

19. An apparatus as claimed in claim 18, wherein the said smoothing function produced by said function producing means is a polynomial providing the approximation $$f(x)=ax^3+bx^2+cx+d$$

where a, b, c and d are coefficients chosen to provide a spline function f(x) which is adapted to the geometric properties of the region signal and x is the distance from its associated step edge.

20. An apparatus as claimed in claim 17, wherein the gradient of said smoothing function produced by said function producing means at a step edge of a region is dependent upon the width of such region.

* * * * *